Feb. 22, 1927.
1,618,851
E. J. THUNBERG ET AL
DETACHABLE COUPLING FOR LIFTING ROPES AND THE LIKE
Filed June 9, 1925

Inventors
E. J. Thunberg
H. G. A. Åkerlind
By Marton Cluck
Attys.

Patented Feb. 22, 1927.

1,618,851

UNITED STATES PATENT OFFICE.

ERNST JOSEF THUNBERG AND HILMER GUSTAV ADOLF ÅKERLIND, OF TROLLHATTAN, SWEDEN.

DETACHABLE COUPLING FOR LIFTING ROPES AND THE LIKE.

Application filed June 9, 1925, Serial No. 36,009, and in Sweden June 6, 1924.

The present invention refers to detachable couplings for lifting ropes and the like of the type having two coupling members, one attached to the lifting rope and the other adapted to be connected with the load, the coupling members being adapted to be moved within each other and to be retained in coupling position by means of annularly arranged catch members.

The object of the invention is not only to provide a hand operated release member to facilitate ready release of the coupling, independently of the relative position of the coupling members, particularly in such lift or pull couplings in which the coupling members are rotatable in relation to each other in order to accommodate for the twisting of the hoist or pulling cable or like member, but also to provide means for preventing the releasing member from unlocking the catch members in consequence of the displacement of the coupling members beyond the coupling position.

The invention will be described in connection with an embodiment thereof as illustrated in the accompanying drawing by way of example, said form of coupling being primarily intended for use in boat davits, although it is evidently also serviceable as a lift or pull coupling for other purposes.

Figure 1:
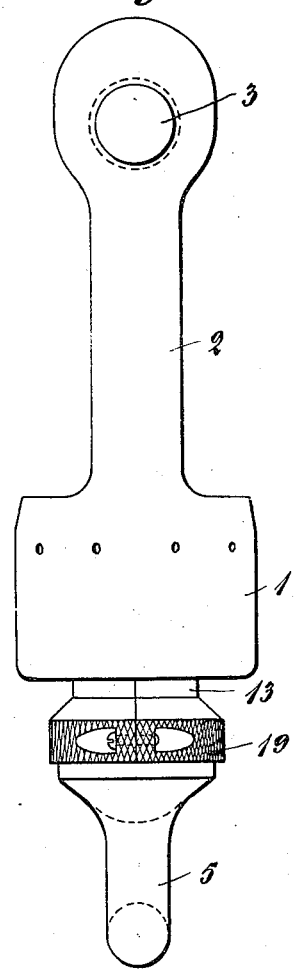
Figure 2:
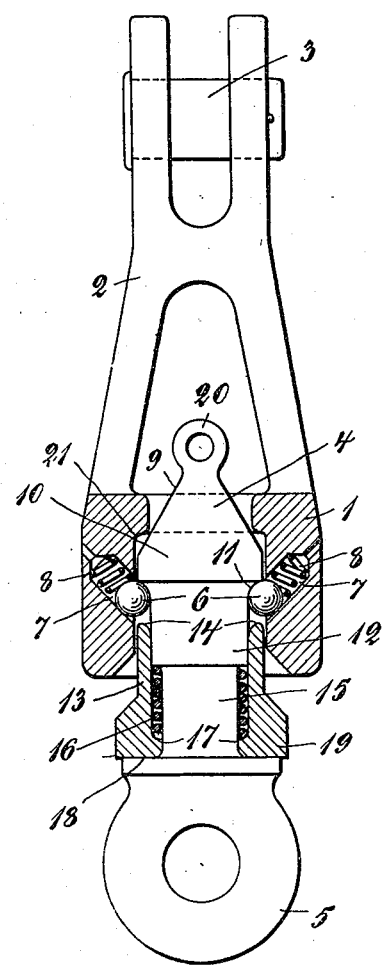
Figure 3:
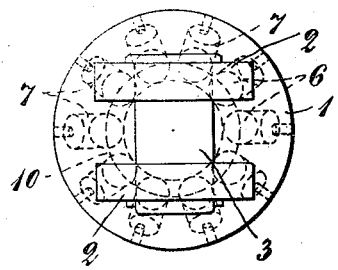

In the drawing, Figure 1 is an elevation of the coupling. Figure 2 shows the coupling in front view, partly in section. Figure 3 is a plan view of the coupling.

One coupling member consists of a cylindrical collar 1 provided with a bracket 2 by means of which it is suspended from a bolt or pin 3 mounted in the lower block of the davit or attached to the lift or pull wire. The other coupling member consists of a plunger 4 accommodated in the collar 1 and having its lower portion formed into a ring or eye 5 adapted to be attached to the life boat or to the load to be lifted or supported. The catch members, which in the present case consist of balls 6, are provided, in a manner known per se, in a corresponding number of annularly arranged internal holes or pockets 7 in the collar 1, said pockets opening obliquely downwards and having their mouths restricted in such a manner that the balls can only in part project through the mouths under the influence of their own weight or of helical springs 8 provided between the balls and the bottoms of the pockets. When the plunger is introduced into the collar, the balls are first moved back into their pockets by the conical head 9 of the plunger, whereupon, after the widest cylindrical portion 10 of the plunger has moved past the pockets, the balls will snap into a groove 11 beneath the said cylindrical portion, whereby the plunger will be locked in the collar. On the coupling being loaded the balls are jammed between the groove 11 and the lower surfaces of the pockets 7. The groove merges into a cylindrical shank 12 having displaceably arranged thereon a cylindrical sleeve 13 divided into two parts secured to one another by means of screws, the said sleeve 13 having an outer diameter equal or substantially equal to the diameter of the widest portion 10 of the plunger. The top edge 14 of the sleeve 13 is shaped so as to occupy the groove 11 when the sleeve is moved upwardly, whereby the outer surface of the sleeve is caused to form a uniform continuation of the widest portion 10 of the plunger. Arranged on a lower reduced portion 15 of the shank 12 is a helical spring 16 abutting partly against the shoulder of the somewhat wider upper part, and partly against an annular inner shoulder 17 of the loose sleeve 13. The spring 16, which is thus enclosed between the plunger, and the loose sleeve, tends to keep the latter bearing normally against the flange 18 of the eye 5. The lower portion of the loose sleeve 13 forms an annular boss 19 serving as a handle in displacing the sleeve 13 upwards against the tension of the spring, the balls being then forced back by the front edge of the sleeve into the pockets clear of the external periphery of the sleeve 13 and the cylindrical portion 10 of the plunger, so that the latter is released.

The upper end of the plunger is formed into a ring 20 on to which may be attached a guide line if desired, said guide line being threaded through the collar 1 and then extended, when coupling is to be effected, so as to serve as a guide for the collar when the latter is being lowered. Coupling may thus take place automatically so as to avoid the difficulties and risks that are otherwise met with in grasping and attaching the heavy swinging coupling member in a rough sea for example.

An inner abutment 21 on the collar 1 limits the movement of the plunger 4 relatively to the collar, so that the balls cannot be influenced by the releasing sleeve 13 whilst coupling is effected.

The sleeve 13 may, optionally, be replaced by a nut screwed on the piston, the part 19 of the sleeve as a handle being preferably replaced by a hexagonal head to operate the nut by means of a wrench or other tool. By such an arrangement it is obviously possible to actuate the releasing mechanism with so great an amount of power that the coupling may be unhitched whilst under load if required.

Obviously the catch balls may be arranged in the inner coupling member 4, in which case the groove 11 serving as a locking surface may be provided on the inside of the collar 1. The movable sleeve 13 may in such case be adapted to act in a like manner as in the case previously described, that is to say, to fill the groove 11 entirely or approximately when in its operative position, the inner diameter of the sleeve having then to coincide approximately with the outer diameter of the groove.

In place of balls, rollers or similar readily movable members may be used as catch members.

We claim:

1. A detachable coupling for lifting ropes and the like comprising a coupling sleeve, a coupling plunger adapted to be moved into coupling position within said sleeve, one of said coupling members being attached to the lifting rope and the other to the load, a number of catch members arranged annularly on one of the coupling members, an annular abutment on the other coupling member adapted to be engaged by said catch members to retain the coupling members in coupling position, and a sleeve-formed release member displaceable axially between the coupling members against the said annular abutment to force the catch members out of engagement with said abutment.

2. A detachable coupling according to claim 1, characterized by the sleeve-formed release member and the annular abutment having substantially the same outer diameter so that the former, when in operative position, will fill up substantially the annular groove which, in the coupling position, is engaged by the catch members.

3. A detachable coupling for lifting ropes and the like comprising a coupling sleeve, a coupling plunger adapted to be moved into coupling position within said sleeve, one of said coupling members being attached to the lifting rope and the other to the load, a number of catch members arranged annularly on one of the coupling members, an annular abutment on the other coupling member adapted to be engaged by said catch members to retain the coupling members in coupling position, a sleeve-formed release member displaceable axially between the coupling members against the said annular abutment to force the catch members out of engagement with said abutment and means counteracting axial displacement of the sleeve-formed release member against the said annular abutment.

4. A detachable coupling according to claim 3, characterized by the sleeve-formed release member being normally kept out of operative position by means of a spring.

5. A detachable coupling for lifting ropes and the like comprising a coupling sleeve, a coupling plunger adapted to be moved into coupling position within said sleeve, one of said coupling members being attached to the lifting rope and the other to the load, a number of locking balls disposed within annularly arranged recesses inside the sleeve, an annular abutment on the plunger adapted to be engaged by said locking balls, a sleeve formed release member mounted on the plunger, and displaceable axially against the said annular abutment to force the balls out of engagement, and a spring arranged between the sleeve-formed release member and the plunger in such a manner as to counteract the axial displacement of the release member against the said abutment.

In testimony whereof we affix our signatures.

ERNST JOSEF THUNBERG.
HILMER GUSTAV ADOLF ÅKERLIND.